(12) United States Patent
Selvaggi et al.

(10) Patent No.: US 7,864,201 B2
(45) Date of Patent: *Jan. 4, 2011

(54) VERTEX DATA PROCESSING WITH MULTIPLE THREADS OF EXECUTION

(75) Inventors: Richard J. Selvaggi, Doylestown, PA (US); Gary W. Root, Harleysville, PA (US)

(73) Assignee: Broadcom Corporation, Irvine, CA (US)

(*) Notice: Subject to any disclaimer, the term of this patent is extended or adjusted under 35 U.S.C. 154(b) by 1147 days.

This patent is subject to a terminal disclaimer.

(21) Appl. No.: 11/250,754

(22) Filed: Oct. 14, 2005

(65) Prior Publication Data

US 2006/0033757 A1 Feb. 16, 2006

Related U.S. Application Data

(63) Continuation of application No. 09/632,759, filed on Aug. 4, 2000, now Pat. No. 6,963,347.

(51) Int. Cl.
G09G 5/24 (2006.01)
(52) U.S. Cl. .................... 345/643; 345/561
(58) Field of Classification Search ........ 345/643, 345/561
See application file for complete search history.

(56) References Cited

U.S. PATENT DOCUMENTS

| | | | |
|---|---|---|---|
| 4,449,201 A | | 5/1984 | Clark |
| 4,868,557 A | * | 9/1989 | Perlman ............ 345/538 |
| 5,369,737 A | | 11/1994 | Gholizadeh et al. |
| 5,406,306 A | * | 4/1995 | Siann et al. .......... 345/546 |
| 5,559,954 A | * | 9/1996 | Sakoda et al. ........ 345/546 |
| 5,651,106 A | | 7/1997 | Ashburn |
| 5,903,272 A | | 5/1999 | Otto |
| 5,995,111 A | | 11/1999 | Morioka et al. |
| 6,356,269 B1 | * | 3/2002 | Nakatsuka et al. ...... 345/505 |
| 6,525,737 B1 | * | 2/2003 | Duluk et al. .......... 345/506 |
| 6,707,452 B1 | | 3/2004 | Veach |
| 6,717,576 B1 | | 4/2004 | Duluk et al. |
| 6,720,976 B1 | | 4/2004 | Shimizu et al. |
| 6,963,347 B1 | * | 11/2005 | Selvaggi et al. ........ 345/619 |
| 6,967,748 B1 | * | 11/2005 | Takarada ............. 358/1.9 |
| 7,010,177 B1 | * | 3/2006 | Mattison ............. 382/305 |
| 2001/0020945 A1 | | 9/2001 | Hsieh et al. |
| 2007/0165035 A1 | * | 7/2007 | Duluk et al. .......... 345/506 |

OTHER PUBLICATIONS

Krammer, "Parallel Processing with a Sorting Network", IEEE International Symposium on Circuits and Sytems, 1990, vol. 2, May 1-3, 1990, pp. 966-969.

Bellettini, et al., "A Digital Parallel VLSI Architecture for Fuzzy Data Base Mining", Proceedings of the Third IEEE Conference on IEEE World Computational Intelligence, vol. 1, Jun. 26-29, 1994, pp. 284-289.

Microsoft Computer Dictionary Fifth Edition, 2002, pp. 213.

* cited by examiner

Primary Examiner—Javid A Amini
(74) Attorney, Agent, or Firm—McAndrews, Held & Malloy, Ltd.

(57) ABSTRACT

A method for processing video image data including a plurality of different image data types begins by providing tasks to be performed on each different image data type. The image data is divided into a plurality of groups based on the image data type. A set of arithmetic operations required to accomplish the tasks provided for the corresponding image data type is determined. Each arithmetic operation is assigned to one of a plurality of commonly used arithmetic units which performs the arithmetic operation, whereby each image data type is transformed in accordance with the corresponding provided tasks. The transformed image data of each group is combined, completing the processing.

20 Claims, 5 Drawing Sheets

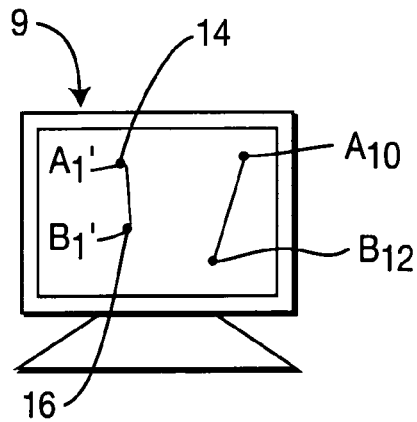
FIG. 1A
| $X_0$ |
|---|
| $Y_0$ |
| $Z_0$ |
| $W_0$ |
| $S_0$ |
| $T_0$ |
| $X_1$ |
| $Y_1$ |
| $Z_1$ |
| $W_1$ |
| $S_1$ |
| $T_1$ |
| $C_0$ |
| $C_1$ |
20
| |
|---|
| $X_0 \cdot a_1 + a_2$ |
| $Y_0 \cdot b_1 + b_2$ |
| $Z_0 \cdot c_1 + c_2$ |
| $W_0$ |
| $S_0$ |
| $T_0$ |
| $X_1 \cdot a_3 + a_4$ |
| $Y_1 \cdot b_3 + b_4$ |
| $Z_1 \cdot c_3 + c_4$ |
| $W_1$ |
| $S_1$ |
| $T_1$ |
| $C_0 = c_0 + a_5$ |
| $C_1 = c_1 + a_6$ |
40
FIG. 1B
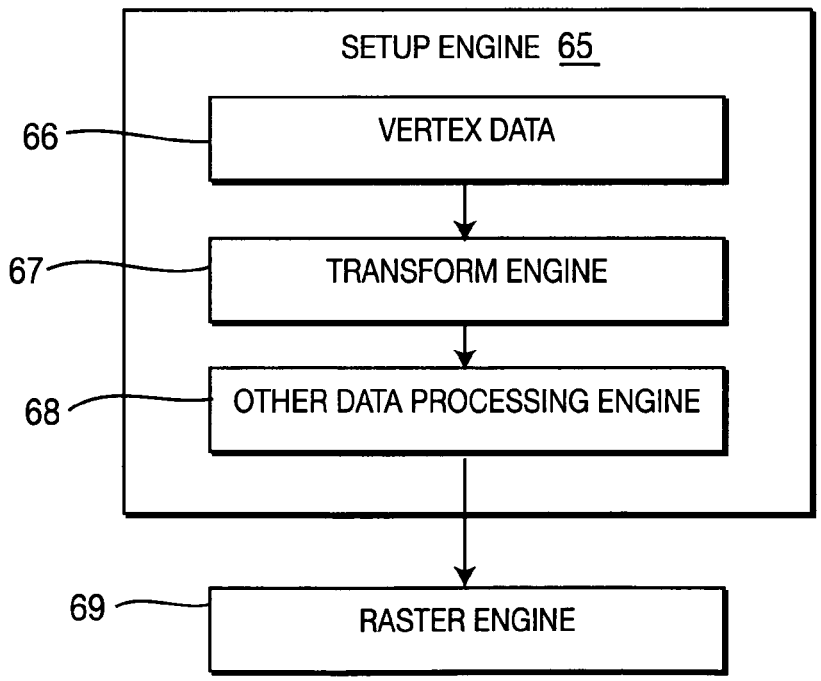
FIG. 2

| | | |
|---|---|---|
| 80 | POSITION STATE OPERATION 0 | $X = X * c_1$ |
| 81 | POSITION STATE OPERATION 1 | $Y = Y * c_2$ |
| 82 | POSITION STATE OPERATION 2 | $Z = Z * c_3$ |
| 83 | POSITION STATE OPERATION 3 | $X = X * W_0$ |
| 84 | POSITION STATE OPERATION 4 | $Y = Y * W_0$ |
| 85 | POSITION STATE OPERATION 5 | $Z = Z * W_0$ |
| 86 | POSITION STATE OPERATION 6 | $X = X + a_1$ |
| 87 | POSITION STATE OPERATION 7 | $Y = Y + a_2$ |
| 88 | POSITION STATE OPERATION 8 | $Z = Z + a_3$ |
| 89 | POSITION STATE OPERATION 9 | WAIT |

| | | |
|---|---|---|
| 100 | COLOR STATE OPERATION 0 | $R_d = R_d + C$ |
| 101 | COLOR STATE OPERATION 1 | $G_d = G_d + C$ |
| 102 | COLOR STATE OPERATION 2 | $B_d = B_d + C$ |
| 103 | COLOR STATE OPERATION 3 | $A = A + C$ |
| 104 | COLOR STATE OPERATION 4 | $R_s = R_s + C$ |
| 105 | COLOR STATE OPERATION 5 | $G_s = G_s + C$ |
| 106 | COLOR STATE OPERATION 6 | $B_s = B_s + C$ |
| 107 | COLOR STATE OPERATION 7 | $F = F + C$ |
| 108 | COLOR STATE OPERATION 8 | $R_d = R_d$ |
| 109 | COLOR STATE OPERATION 9 | $R_s = R_s$ |
| 110 | NOP | |

I: INITIAL
D: DONE

| | | |
|---|---|---|
| 120 | TEXTURE STATE OPERATION 0 | $S_i = S_i$ |
| 121 | TEXTURE STATE OPERATION 1 | $T_i = T_i$ |
| 122 | TEXTURE STATE OPERATION 2 | $S_i = S_i * W_O$ |
| 123 | TEXTURE STATE OPERATION 3 | $T_i = T_i * W_O$ |
| 124 | TEXTURE STATE OPERATION 4 | $S_i = S_i * \text{RANGE}$ |
| 125 | TEXTURE STATE OPERATION 5 | $T_i = T_i * \text{RANGE}$ |
| 126 | TEXTURE STATE OPERATION 6 | $S_i = S_i * \text{SIZE}$ |
| 127 | TEXTURE STATE OPERATION 7 | $T_i = T_i * \text{SIZE}$ |

I: INITIAL
D: DONE

VERTEX DATA PROCESSING WITH MULTIPLE THREADS OF EXECUTION

CROSS REFERENCE TO RELATED APPLICATION

This application is a continuation of U.S. patent application Ser. No. 09/632,759, filed Aug. 4, 2000, which is incorporated by reference as if fully set forth herein.

BACKGROUND

The addressable and displayable basic element used to build up a computer image is a pixel. Each pixel has several essential parameters stored as the pixel's vertex data. Typical parameters are position data, such as an X coordinate, a Y coordinate and a Z coordinate, that indicate the pixel's reference position in three dimensions (3D); color information, such as diffuse color parameters ($R_D, G_D, B_D$, A) and specular color parameters ($R_S, G_S, B_S$, F) which form the pixel's diffuse color and specular color; texture information, such as the pixel's texture pattern and the depth of the pattern from the viewer; or any other suitable information needed by the specific individual application. Based on the graphic standards used by an application, parameters may be stored in different orders or formats within the vertex data. For example, coordinate parameters may be stored as 32-bit floating-point format or fixed-point format. The color information parameters may be stored as a simple group of 4 bytes or as a complicated group of 16 bytes. The graphic device displays the pixel based on its vertex data parameters.

Typical image display systems by using hardware and software have automated several primitive draw functions. For example as shown in FIG. 1a, to draw a line, the application needs to provide only the beginning pixel point A 10 ($X_1, Y_1, Z_1$) and the ending pixel point B 12 ($X_2, Y_2, Z_2$) to the graphic device 9. The graphic device 9 determines which pixels are on the line between pixel A 10 and pixel B 12. Subsequently, the graphic device 9 sets up these pixels' color information using the A and B pixels' color parameters. If the application wants to move the line to a new location, the new positions of A 10 will be AN 14 ($X_1+a, Y+b, Z_1$) and B 12 will be BN 16($X_2+a, Y_2+b, Z_2$). If a scaling factor c is involved, the new AN 14 pixel will be ($x_1*c+a, y_2*c+b, z_2$) and BN 16 will be ($X_2*c+a, Y_2*c+b, Z_2$).

The same principle applies to drawing a triangle, another primitive function. An application provides vertex data that has parameters of the three triangle end points. The graphic device 9 will set up the vertex data of all relevant pixels to draw the triangle. All two dimensional (2D) or 3D graphic objects are made up of a number of polygons which can be broken into primitive functions, such as lines, triangles etc. To redraw 2D or 3D graphic objects requires redrawing the relevant primitives. The redrawing requires setting up all corresponding pixels' vertex data and redrawing them. All graphic operations, simple or complicated, are performed by manipulating the contents of pixel vertex data by multiplication, addition or logical operations, such as OR and exclusive OR.

Users of personal computers or game systems utilize real-time effects on displayed images. In such systems, a 2D or 3D image is displayed at a rate of 30 or more frames per second. These rates allow the user to perceive continuous motion of objects in a scene. To achieve such a real-time, realistic and interactive image requires a tremendous amount of processing power. These effects require processing over a million graphic primitives per second. Typically, processing a million primitives requires multiplying and adding millions of floating-point and fixed-point values.

Accordingly, it is desirable to improve the efficiency of transforming vertex data.

SUMMARY

Multi-thread video data processing for use in a computer video display system. The parameters of vertex data are grouped into a plurality of groups. The computation needs of each group are broken down into several arithmetic operations to be performed by corresponding arithmetic units. The units concurrently process the vertex data.

BRIEF DESCRIPTION OF THE DRAWINGS

FIG. 1a illustrates two displayed line images.
FIG. 1b is the vertex data of the lines of FIG. 1a.
FIG. 2 illustrates functional blocks of a setup engine.

DETAILED DESCRIPTION OF THE PREFERRED EMBODIMENTS

Figures 3A, 3B:
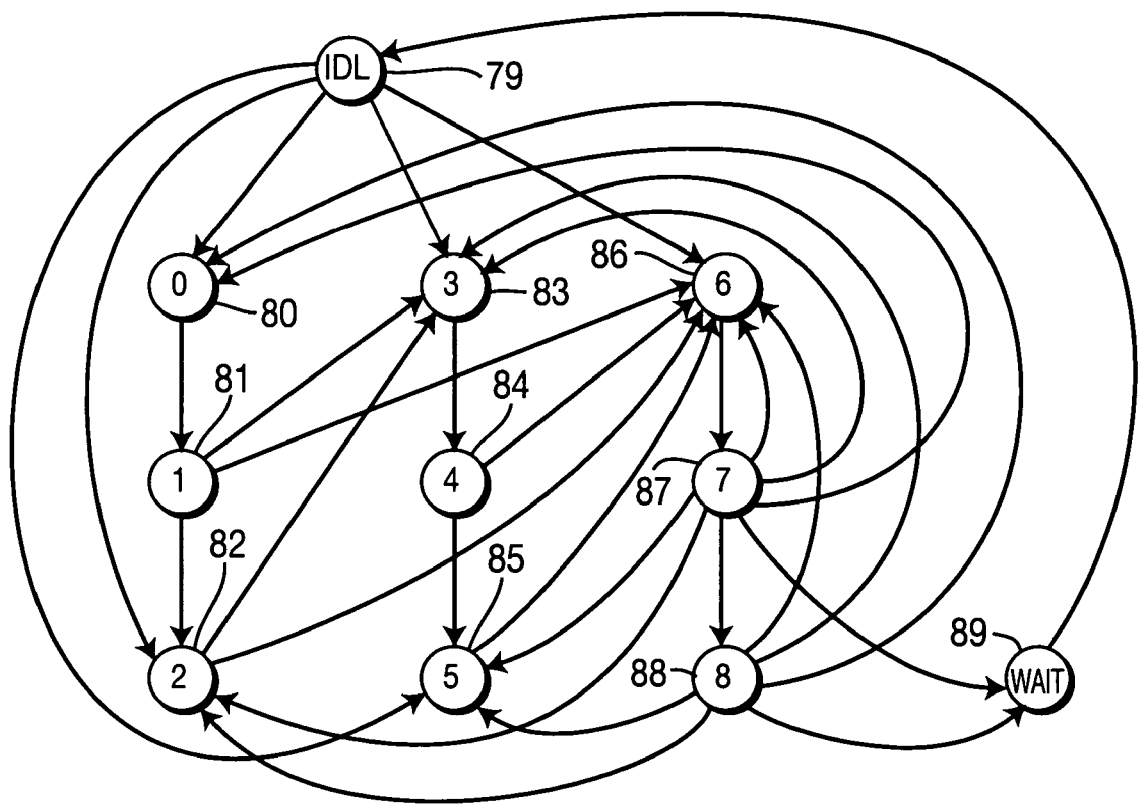
FIG. 3a is a table of the basic state operations for the position data group.
FIG. 3b is a state diagram for the position data group.

Instead of using a traditional sequential processing approach, a multi-thread approach to process the vertex data may be used. As shown in FIGS. 1a and 1b, computer monitor 9 displays a first line with the beginning pixel point A 10 with parameters $X_0, Y_0, Z_0, W_0, S_0, T_0, C_0$ and the end pixel point B 12 with parameters $X_1, Y_1, Z_1, W_1, S_1, T_1$ and $C_1$ stored as vertex data 20. That line may be modified. It may be moved to a new location, such as to begin point 14 and end point 16. It may be scaled. It may have its specular color and texture pattern modified. One approach to redrawing the line is to process all parameters of vertex data 20 into new vertex data 40 before the new vertex data 40 is submitted for the line redraw.

The transform process will be explained with reference to modifying a line's pixel vertex data parameters. This transform process may be used for any transformation. As shown in FIG. 2, the transform engine 67 is a part of a setup engine 65. Vertex data is transformed by the transform engine 67 and processed by the other data processing engine 68. Subsequently, the transformed and processed data is sent to raster engine 69 prior to output to the monitor 9.

The transform engine 67 initially groups vertex data parameters together for processing. The groups allow for more efficient utilization of each arithmetic unit, such as a floating-point multiplication unit and a floating-point addition unit. One grouping scheme groups: the pixel position vertex data, the pixel color vertex data and the pixel texture vertex data together. To illustrate for a line, the pixels' position data $X_0, Y_0, Z_0$ and $W_0$ and $X_1, Y_1, Z_1$ and $W_1$ is selected as a first group. The pixels' color data $C_0$ and $C_1$ is selected as a second group and the pixels' texture data $S_0, T_0$ and $S_1, T_1$ is selected as a third group. By analyzing the computational requirements of each group, the required tasks can be broken down into addition and multiplication operations. The broken down operations are used to construct multiplication and addition state operations. Any computation needs of the group can be fulfilled by using the combination of its basic state operations to achieve the final results. Using sequential states, the addition unit may perform operations such as subtraction, move, floating-point number conversion to fixed number, truncate, round to even, round to odd.

To transform the position data group as shown in FIG. 3a, one approach is to use ten basic state operations 80-89. Six 80-85 out of the ten basic 80-89 state operations involve multiplication. Three state operations 86-88 involve addition and one state operation 89 is a wait, no operation (NOP), state operation. There is also an idle state 79. As shown in FIG. 3a, position state operation 0 80 involves multiplying the X coordinate by a scale factor. Position state operation 8 88 involves adding the Z coordinate with an offset. For vertex data of the initial line begin pixel A 10 ($X_0$, $Y_0$, and $Z_0$) transforms to $$(X^0 = X_0 * c_1 + a_1, \quad Y^0 = Y_0 * c_2 + a_2, \quad Z^0 = Z_0 * c_3 + a_3).$$

The transformation will require position state operations (PSO) 0, 6, 1, 7, 2 and 8; 80, 86, 81, 87, 82 and 88 to complete the whole computation. Referring back to FIG. 3b, the different paths from one position state operation to other position data state operations are shown.

Figures 4A, 4B:
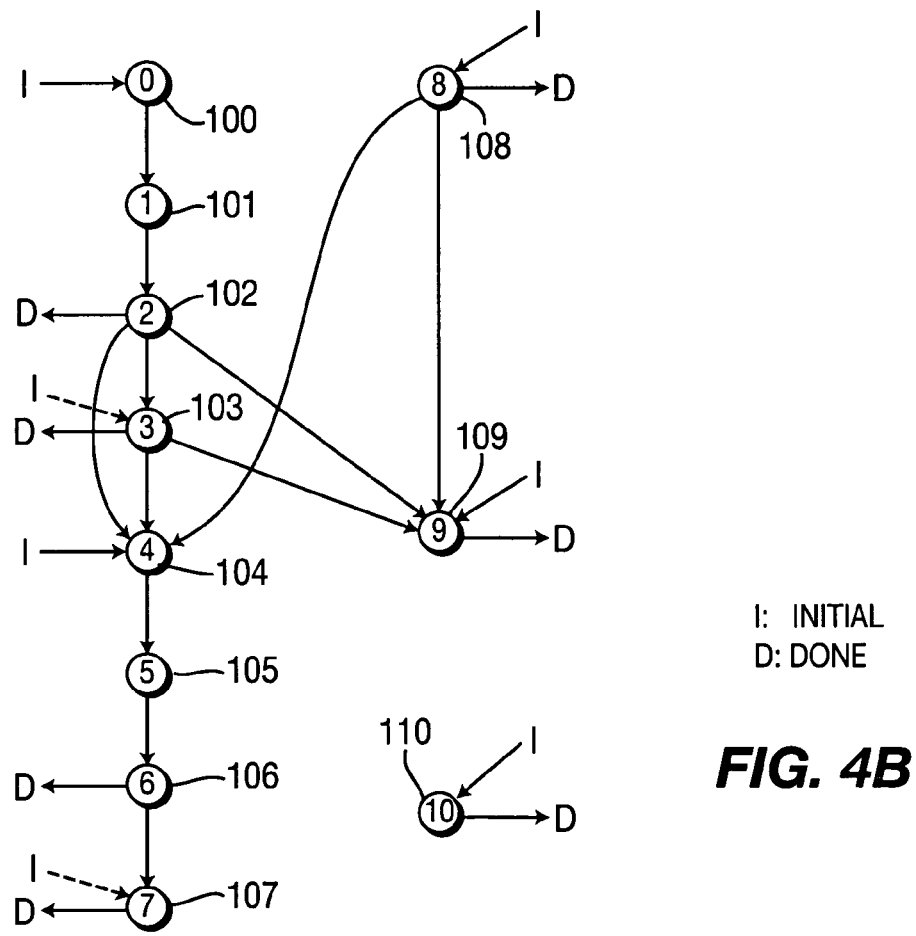
FIG. 4a is a table of the basic state operations for the color information group.
FIG. 4b is the state diagram for the color information group.
Figures 5A, 5B:
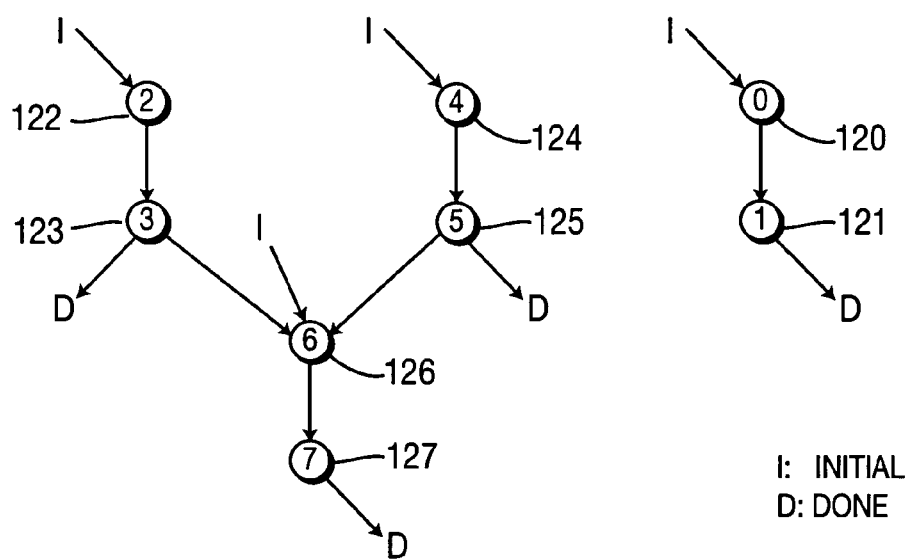
FIG. 5a is a table of the basic state operations for the texture information group.
FIG. 5b is the state diagram flow chart for the texture information group.

To transform the color data group, one approach is to use ten independent color state operations (CSO), as shown in FIG. 4a. Each CSO involves only addition with one color parameter. CSO 0-3 100-102 are related to diffuse color parameters addition, CSO 4-7 104-107 are related to specular color parameters addition, and CSO 8-9 108-109 move the $R_s$ and $R_d$ vertex data. The move operation may be performed using an addition unit. The different paths from one color state operation to other color state operations are shown in FIG. 4b. To transform the texture data group, one approach is to use eight texture state operations (TSOs). Six 122-127 of the TSOs are multiplication related and two 120, 121 of the TSOs are moves which can be performed by addition. FIG. 5a shows the different paths from one TSO 120-127 to other TSOs 120-127.

By grouping the vertex data into position, color and textural groups, multiple arithmetic units, such as a floating-point multiplication and a floating-point addition unit, may be utilized more efficiently. To illustrate, if position group data is utilizing the floating-multiplication unit to perform a multiplication operation, simultaneously an addition operation of either the color group or texture group can utilize the addition unit. By continuously sending multiplication and addition operations to queues associated with the multiplication and addition units, both the multiplication and addition unit are used with higher efficiency accelerating data processing.

Each of these groups of operations comprise a "program", or "thread of execution" that vies for the use of the shared arithmetic resources. Multiple controllers are typically used, each executing a thread, that can generate a sequence of instruction for the shared arithmetic resources.

It is a common requirement that the vertex data processor be flexible enough, via programmability, to perform a certain subset of all of its possible operations, for any given graphics primitive or vertex. Since the exact operations to be performed by the transform engine are not known until run-time, it is desirable for the processor to respond dynamically to the processing workload to efficiently use the available processing resources. One technique for dynamic processing is to group the operations based on which function unit they use. Subsequently, the operations are concurrently scheduled to each function unit.

Figure 6:
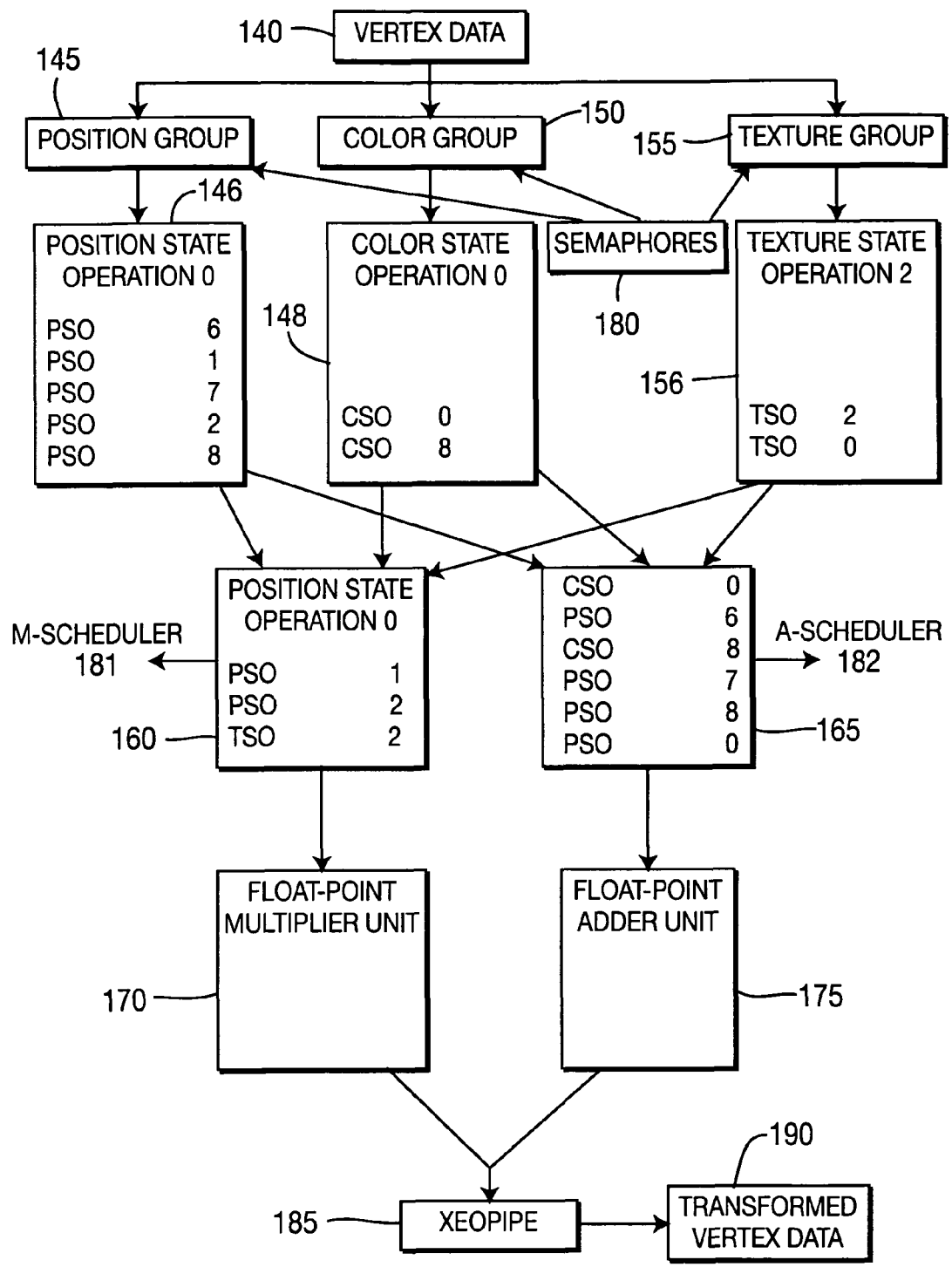
FIG. 6 illustrates the functional process flow for the transform engine.

To illustrate as shown in FIG. 6, the vertex data 140 is broken into three groups; position group 145, color group 150 and texture group 155. The position group 145 requires PSO 0, 6, 1, 7, 2 and 8; 80, 86, 81, 87, 82 and 88 to complete its data transformation. The color group 150 requires CSO 0 and 8; 100 and 108 to complete its transformation. The textural group 155 requires TSO 0 and 2; 120 and 122 to transform the textural parameters. All multiplication state operations from the position or textural groups 145, 155 will be queued at the multiplication queue 160 and all addition state operations from all three groups 145, 150, 155 will be queued at the addition queue 165. The queued operations of both queues 160, 165 will be independently executed by the multiplier unit 170 and the adder unit 175. The queues are controlled by schedulers, such as an M-scheduler 181 and A-scheduler 182.

In certain circumstances, coordination between threads is needed. For example, intermediate results from the position thread (for example, perspective-related information) may be required by the texture thread. Binary or counting semaphore 180 can be used to synchronize the sequential execution of two different threads and to signal when the result from one thread is available for the next thread to consume. The results of the executed operations are sent to a post-processing engine 185, such as the XEOPIPE, which performs operations, such as rounding or conversion from floating-point to fixed-point format. The buffer 190 holds the transformed vertex data until required by other processes.

What is claimed is:

1. A method for processing video image data, including a plurality of different image data types, the method comprising the steps of:

providing tasks to be performed on each different image data type;

dividing the image data into a plurality of groups based on the image data type, wherein the image data type comprises position, color, and texture;

determining a set of arithmetic operations required to accomplish the tasks corresponding to the image data type;

assigning each arithmetic operation of the set to one of a plurality of commonly used arithmetic units of a processor;

performing each arithmetic operation by an assigned arithmetic unit of said arithmetic units, whereby each image data type is transformed in accordance with the corresponding provided tasks; and combining the transformed image data of each group of said plurality of groups.

2. The method of claim 1 wherein the plurality of image data groups includes a position group for position vertex parameters, a color group for color vertex parameters, and a texture group for texture vertex parameters.

3. The method of claim 1 wherein the plurality of said commonly used arithmetic units includes an addition unit and a multiplication unit of said processor.

4. The method of claim 1 wherein the determining step is based on in part by a sequence of arithmetic states.

5. The method of claim 1 further comprising the step of:

providing a queue for each of the plurality of commonly used arithmetic units, wherein each assigned arithmetic operation is sent to the queue associated with its commonly used arithmetic unit.

6. The method of claim 1 further comprising the step of:
preventing the arithmetic units from performing the arithmetic operations of a task out of sequence.

7. An apparatus for processing video image data, including a plurality of different image data types, the apparatus comprising:
a plurality of commonly used arithmetic units;
a transform engine, configured to:
provide tasks to be performed on each different image data type;
divide the image data into a plurality of groups based on the image data type, wherein the image data type comprises position, color, and texture;
determine a set of arithmetic operations required to accomplish the tasks corresponding to the image data type;
assign each arithmetic operation of the set to one of said plurality of commonly used arithmetic units,
whereby each image data type is transformed in accordance with the corresponding provided tasks; and
combine the transformed image data of each group.

8. The apparatus of claim 7 wherein the plurality of image data groups includes a position group for position vertex parameters, a color group for color vertex parameters, and a texture group for texture vertex parameters.

9. The apparatus of claim 7 wherein said plurality of commonly used arithmetic units includes an addition unit and a multiplication unit.

10. The apparatus of claim 7 wherein for each image data group, the arithmetic operation set includes a set of arithmetic states and the determined operations for each task are defined by a sequence of the set's arithmetic states.

11. The apparatus of claim 7 further comprising:
a queue for each of said plurality of commonly used arithmetic units, wherein each arithmetic operation is sent to the queue associated with its commonly used arithmetic unit.

12. The apparatus of claim 7, wherein said transform engine is further configured to:
prevent the arithmetic units from performing the arithmetic operations of a task out of sequence.

13. An apparatus for performing video processing, including performing tasks on vertex parameters, the apparatus comprising:
a scheduler having an input configured to receive tasks, said scheduler configured to arrange the vertex parameters to be processed into a plurality of groups based on in part characteristics of the vertex parameters;
a sequencer for each of the plurality of groups, said sequencer configured to:
determine the tasks required to process that group's parameters;
determine a set of arithmetic operations required to accomplish that group's tasks;
assign each arithmetic operation of the set to be performed to one of a plurality of commonly used arithmetic units; and
send each arithmetic operation to the arithmetic unit associated with that arithmetic operation, wherein each of said commonly used arithmetic units has an input configured to receive and execute the sent arithmetic operations and vertex parameters associated with the sent operations.

14. The apparatus of claim 13 wherein the plurality of groups includes a position group for position vertex parameters, a color group for color vertex parameters, and a texture group for texture vertex parameters.

15. The apparatus of claim 13 wherein said plurality of commonly used arithmetic units includes an addition unit and a multiplication unit.

16. The apparatus of claim 13 wherein for each group, the arithmetic operation set includes a set of arithmetic states and the determined operations for each task are defined by a sequence of the set's arithmetic states.

17. The apparatus of claim 13, further comprising a queue for each of said commonly used arithmetic units, wherein the sent arithmetic operations are sent to the queue associated with said commonly used arithmetic unit.

18. The apparatus of claim 13 wherein said sequencer prevents said arithmetic units from performing the arithmetic operations of a task out of sequence.

19. A method of processing video data comprising:
categorizing said video data into groups based on pixel position, pixel color, and pixel texture, wherein each of said groups is associated with a set of state operations;
transforming said video data in each of said groups using said associated set of state operations, wherein each state operation of said state operations is categorized as a multiplication state operation or an addition state operation;
scheduling all multiplication state operations of said state operations using a first queue for queuing multiplication state operations, said first queue generating a first output;
scheduling all addition state operations of said state operations using a second queue for queuing addition state operations, said second queue generating a second output;
transmitting said first output to a multiplier unit of one or more processors to execute multiplication operations, said multiplier unit generating a third output;
transmitting said second output to an adder unit of said one or more processors to execute addition operations, said adder unit generating a fourth output; and
combining said third output and said fourth output.

20. A system for processing video data comprising:
one or more processors operable for, at least:
categorizing said video data into groups based on pixel position, pixel color, and pixel texture, wherein each of said groups is associated with a set of state operations;
transforming said video data in each of said groups using said associated set of state operations, wherein each state operation of said state operations is categorized as a multiplication state operation or an addition state operation;
scheduling all multiplication state operations of said state operations using a first queue for queuing multiplication state operations, said first queue generating a first output;
scheduling all addition state operations of said state operations using a second queue for queuing addition state operations, said second queue generating a second output;
transmitting said first output to a multiplier unit to execute multiplication operations, said multiplier unit generating a third output;
transmitting said second output to an adder unit to execute addition operations, said adder unit generating a fourth output; and
combining said third output and said fourth output.

* * * * *